Nov. 29, 1938.  A. S. CAMPBELL  2,138,782
VERTICAL BUMPER
Filed July 7, 1937
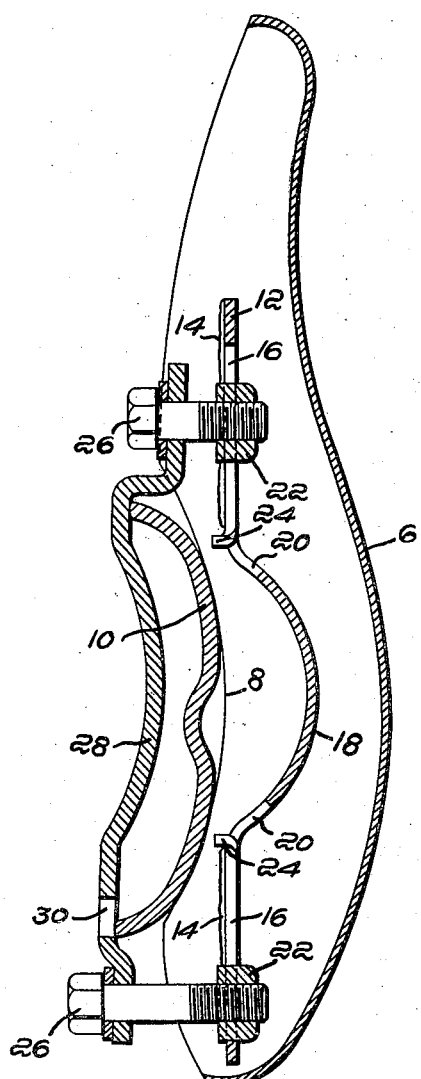
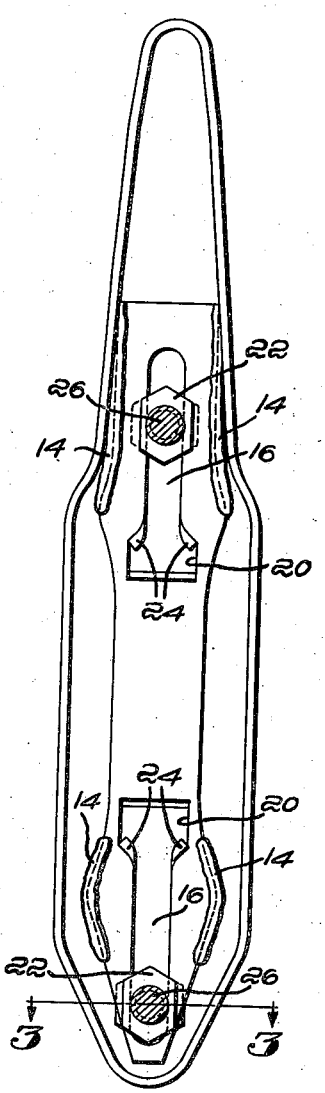
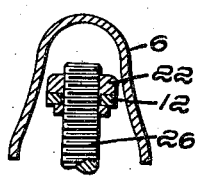
Inventor:
Alphonso S. Campbell,
By Emery, Booth, Townsend, Miller & Weidner
Att'ys Patented Nov. 29, 1938

2,138,782

UNITED STATES PATENT OFFICE 2,138,782

VERTICAL BUMPER

Alphonso S. Campbell, Winchester, Mass., assignor to A. S. Campbell Co., Inc., East Boston, Mass., a corporation of Massachusetts Application July 7, 1937, Serial No. 152,362

6 Claims. (Cl. 293—55)

The ordinary bumper utilized on automobiles, whether in one or several parts, consists essentially of a horizontally disposed bar of limited vertical dimension extending across the width of the vehicle. Since automobiles differ in height and since even in vehicles of the same kind the elevation of the bumper above the road will vary in accordance with the load on the vehicle, considerable inconvenience and damage is caused by a bumper of one car passing above or below another or interlocking therewith. It has therefore become common to attach to the bumper bar vertical cross pieces providing a surface of considerable height or depth to engage the bumper of another car and prevent such action. Such devices have been variously termed "bumper guards", "grille protectors" and "vertical bumpers".

My invention relates more particularly to the construction of such devices which provides for clamping them in position on the horizontal bumper bar, and the object is to provide a simple and effective means for this purpose giving a wide range of variation for the purpose of adapting the attachment to different widths of horizontal bumpers or of varying the rake or angle to the vertical of the so-called vertical bumper.

My invention will be well understood by reference to the following description thereof taken in connection with the accompanying drawing, wherein:—

Fig. 1 is a vertical section of the vertical bumper in position on the horizontal bumper bar;

Fig. 2 is a rear view thereof, the horizontal bumper and the securing plate being omitted; and Fig. 3 is a section on the line 3—3 of Fig. 2.

Referring to the drawing, I there show the vertical bumper as comprising an impact body 6 in the form of a stamping of heavy metal concaved rearwardly and having its sides formed to present seats 8 for engaging the horizontal bumper bar 10. Within the hollow of the stamping rearwardly of the front face of the body 6 a plate 12 may be secured as by means of the lines of welding 14 providing for the engagement of the fastening means which secure the body in position.

In accordance with my invention I provide, preferably at both ends of the body, a separable element of a clamp having vertically sliding engagement with the plate 12. For this purpose the ends of the plate may be provided with slots 16 forming vertical ways. The slots 16 are closed at their outer ends while the central portion of the plate may be forwardly offset at 18, as best seen in Fig. 1, and provided with the enlarged openings 20 at the inner ends of the slots permitting a member having an enlarged portion wider than the width of the slots to be entered into the same with the enlarged portions passing behind the margins of the slot to be interlocked with the plate against horizontal movement. Herein this member takes the form of a nut 22 slotted across two opposite flats to provide grooves which fit the margin of the slot. The nuts may be inserted through the enlarged openings 20 and may be secured in position after assembly by slightly deflecting the corner portions 24 of the slot margins where it joins the enlarged openings 20. The nuts are thus permanently mounted in the ways and held against rotation, and since the slots are of substantially greater length than the width of the bolts they have a wide range of vertical adjustment therein.

The vertical bumper body 6 may be secured to the horizontal bumper by bolts 26 tapping into the nuts, the heads of which bolts cooperate with suitable means for clipping against the rear wall of the bumper bar 10. This means is herein shown as a single plate 28 spanning the rear of the bar provided with a suitable number of bolt-receiving holes to provide for the various demands of practice. It will be noted that the mounting of the nut prevents tipping of the same in the plane of the paper, referring to Fig. 1. In other words, the axis cannot be angularly displaced and the engagement of the bolts therein is facilitated.

The wide range of vertical adjustment of the nuts in the slots 14 would, for example, permit them to cooperate with the bolts 26, assuming the lower of these bolts to be inserted in the hole 30 of the plate 28, which in the example shown is purely supernumerary, and the body could be centered relatively to the bolt so placed. Also in any instance a considerable variation of angular position may be provided in accordance with the positioning of the nuts and the amount by which the bolts 26 are taken up.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A vertical bumper comprising a rearwardly concave body, a plate secured within the hollow thereof comprising a forwardly deflected central portion and ends having vertical slots extending to the deflected portion, the said portion having openings permitting the passage of a member having a head wider than the slots into the openings with the head behind the margins of the same, threaded members which have such heads and are received in the slots and of lesser height than the length of the slots, marginal portions of the wall of the slots adjacent the central portion being deflected from the plane of the ends to retain said members in the slots, and means for clamping the body to a horizontal bar including cooperating threaded members.

2. A vertical bumper comprising an impact body having a vertically slotted wall rearward of its front face, a nut having slots in its sides fitting the margins of the slot to slide therein non-rotatably, and means for clamping the body in position on a horizontal bumper comprising a bolt tapping into said nut.

3. A vertical bumper comprising an impact body having a vertically slotted wall rearward of its front face, a threaded member having opposed grooves in which the margins of the slots are received for sliding movement of the member in the slots, and means for clamping the body to a horizontal bumper bar including a cooperating threaded member.

4. A vertical bumper comprising an impact body adapted to be positioned in traversing relation on a horizontal bumper bar, said body having a wall rearward of its front face, vertical slots in said wall having closed outer ends, threaded members having sides engaging over the margins of the slot, means retaining the members from displacement from their positions behind the slots, the length of the slots being substantially greater than the depth of such members whereby to provide a plurality of vertical positions of such members therein, and means for clamping the body to a horizontal bumper bar comprising means for engaging the bar and threaded members engageable therewith cooperating with said first mentioned threaded members for connecting said means to the body across the edges of the bar.

5. A vertical member comprising an impact body adapted to be positioned in traversing relation on a horizontal bar, attaching means for engaging the back of the bar, means adapted to traverse an edge of such bar for securing one end of the body to said attaching means, the body having adjacent the other end thereof a vertical way rearward of its front face, a threaded member permanently mounted in said way and having a substantial range of sliding movement vertically therein, and means including a cooperating threaded member to secure said other end of the body to said attaching means.

6. A vertical member comprising an impact body adapted to be positioned in traversing relation on a horizontal bar, attaching means for engaging the back of the bar, means adapted to traverse an edge of such bar for securing one end of the body to said attaching means, the body having adjacent the other end thereof a vertical way rearward of its front face, a threaded member permanently mounted in said way and having a substantial range of sliding movement vertically therein, the mounting being such as to preclude angular displacement of the axis of the threaded member, and means including a cooperating threaded member to secure said other end of the body to said attaching means.

ALPHONSO S. CAMPBELL.